(12) United States Patent
Bleidorn

(10) Patent No.: US 12,341,749 B2
(45) Date of Patent: Jun. 24, 2025

(54) PROXY ADDRESS RESOLUTION PROTOCOL FOR DISTRIBUTED LOCAL AREA NETWORK COMMUNICATIONS

(71) Applicant: Charter Communications Operating, LLC, St. Louis, MO (US)

(72) Inventor: Timothy Bleidorn, Colorado Springs, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 260 days.

(21) Appl. No.: 17/983,694

(22) Filed: Nov. 9, 2022

(65) Prior Publication Data

US 2024/0154936 A1 May 9, 2024

(51) Int. Cl.
| | |
|---|---|
| *G06F 15/16* | (2006.01) |
| *G06F 9/54* | (2006.01) |
| *H04L 29/06* | (2006.01) |
| *H04L 61/59* | (2022.01) |

(52) U.S. Cl.
CPC .................................. *H04L 61/59* (2022.05)

(58) Field of Classification Search
CPC ... H04L 61/59; H04L 61/103; H04L 61/5014; H04L 2101/622; H04L 2101/668
USPC ......................................................... 709/245
See application file for complete search history.

(56) References Cited

U.S. PATENT DOCUMENTS

| | | | | |
|---|---|---|---|---|
| 5,708,654 A | * | 1/1998 | Arndt ...................... | H04L 61/10 |
| | | | | 370/242 |
| 5,729,689 A | * | 3/1998 | Allard ................. | H04L 61/4552 |
| | | | | 709/228 |
| 6,189,042 B1 | * | 2/2001 | Keller-Tuberg ........ | H04L 61/10 |
| | | | | 370/405 |
| 6,810,420 B1 | * | 10/2004 | Buse ................... | H04L 61/5038 |
| | | | | 709/224 |
| 7,512,136 B2 | * | 3/2009 | Korotin ................... | H04L 61/59 |
| | | | | 370/352 |
| 9,042,272 B2 | * | 5/2015 | Jain ......................... | H04L 61/59 |
| | | | | 370/255 |
| 9,450,914 B2 | * | 9/2016 | Jain ...................... | H04L 61/103 |
| 10,581,793 B1 | * | 3/2020 | Semwal .............. | H04L 12/4641 |
| 11,336,529 B2 | * | 5/2022 | Brandwine ............. | H04L 41/12 |
| 2002/0052972 A1 | * | 5/2002 | Yim ........................ | H04L 61/10 |
| | | | | 370/254 |

(Continued)

OTHER PUBLICATIONS

Broadband Forum "Network Enhanced Residential Gateway" TR-317, Issue 1, pp. 1-67, Jul. 2016.

*Primary Examiner* — Hamza N Algibhah
(74) *Attorney, Agent, or Firm* — Young Basile Hanlon & MacFarlane, P.C.

(57) ABSTRACT

Methods and systems proxy address resolution protocol processing in a distributive local area network is described. The method for proxy address resolution protocol processing includes sending, by a first subscriber device, an address resolution protocol processing broadcast to obtain a second subscriber device address, wherein the first subscriber device and the second subscriber device are in isolated routing prefix domains within a routing prefix, receiving, by the first subscriber device from a gateway, a second subscriber device proxy address for the second subscriber device, and communicating, between the first subscriber device and the second subscriber device via the gateway, using the second subscriber device proxy address.

20 Claims, 11 Drawing Sheets

(56) References Cited

U.S. PATENT DOCUMENTS

| | | | |
|---|---|---|---|
| 2003/0028668 A1* | 2/2003 | Garcia-Luna-Aceves | H04L 45/02 709/238 |
| 2003/0088700 A1* | 5/2003 | Aiken | H04L 61/10 709/217 |
| 2004/0095943 A1* | 5/2004 | Korotin | H04L 61/10 370/395.54 |
| 2004/0213234 A1* | 10/2004 | Koch | H04L 61/5014 370/392 |
| 2007/0097919 A1* | 5/2007 | Tsubota | H04L 61/103 370/331 |
| 2011/0206047 A1* | 8/2011 | Donthamsetty | H04L 12/4641 370/392 |
| 2014/0133354 A1* | 5/2014 | Scharf | H04L 12/46 370/254 |
| 2015/0236952 A1* | 8/2015 | Liang | H04L 45/66 370/230 |
| 2017/0142016 A1* | 5/2017 | Shichino | H04L 67/10 |
| 2017/0346686 A1* | 11/2017 | Mudigonda | H04L 61/5084 |
| 2020/0153784 A1* | 5/2020 | Semwal | H04L 61/103 |
| 2020/0195516 A1* | 6/2020 | Brandwine | H04L 45/02 |
| 2023/0421498 A1* | 12/2023 | Krattiger | H04L 45/22 |
| 2024/0154936 A1* | 5/2024 | Bleidorn | H04L 61/59 |

* cited by examiner

PROXY ADDRESS RESOLUTION PROTOCOL FOR DISTRIBUTED LOCAL AREA NETWORK COMMUNICATIONS

TECHNICAL FIELD

This disclosure relates to network communications. More specifically, providing a proxy address resolution protocol function when implementing a prefix from which static and/or dynamic Internet Protocol (IP) addresses are provided to multiple subscribers and a single gateway address from the prefix is used among the multiple subscribers.

BACKGROUND

Service providers provide static and/or dynamic IP addresses or static and/or dynamic IP service to subscribers, such as small and medium businesses, so that the subscriber can host a website on a subscriber device or user equipment, such as a server, associated with the static and/or dynamic IP address, which is then accessible via the Internet. In some instances, Routing Information Protocol (RIP) and versions thereof are used to deliver static Internet Protocol version 4 (IPv4) addresses to subscribers. Once configured with the static IP address, the subscriber device can communicate using two methods. The subscriber device can communicate with Internet destinations via a gateway or customer premises equipment (CPE). The subscriber device can also directly communicate, using an address resolution protocol (ARP) broadcast, with other devices that are on a local area network associated with a same prefix and/or is within the subnet mask range.

RIP and other technologies consume a significant amount of addressing space to deliver the static IP service and cause a considerable route-bloat in routers. For example, service providers can offer subscribers a static IP service via a routing prefix of 30 bits (/30 routing prefix) in IPv4. The /30 routing prefix provides four IP addresses. However, due to network rules, one IP address is used for the network, one IP address is used for broadcast, and one IP address is used for the gateway or CPE. This then leaves one IP address for the subscriber's device. That is, there is 4:1 ratio of allocated IP addresses to subscriber assignable or useable IP address. This is inefficient and wasteful.

To improve address utilization, service providers have moved to virtual CPE (vCPE) platforms where the service provider can offer subscribers a static IP service via a larger prefix such as a routing prefix of 24 bits (/24 routing prefix) in IPv4. An issue with this static IP service delivery technology is that each subscriber device with a static IP address from the /24 routing prefix believes that the other subscriber devices are on the same LAN because each subscriber device is using the same prefix and/or is within the subnet mask range. Each subscriber device therefore tries to connect directly with the other subscriber devices via the ARP broadcast. However, the ARP broadcast connection attempt fails because rules in the vCPE platform layer 2 isolate each subscriber domain from the other subscriber domains. This may be termed a distributed or distributive LAN environment. Moreover, the subscriber devices cannot communicate using a gateway in the vCPE platform (i.e., as in the case of an Internet destination) since the subscriber devices do not know that the other subscriber devices are not on the same LAN but are actually in the distributed LAN environment.

Consequently, a method is needed to provide communications within the distributed LAN environment.

SUMMARY

Disclosed herein are methods and systems for using a proxy ARP to provide communications within a distributed LAN environment. In implementations, the method for proxy address resolution protocol processing includes sending, by a first subscriber device, an address resolution protocol processing broadcast to obtain a second subscriber device address, wherein the first subscriber device and the second subscriber device are in isolated routing prefix domains within a routing prefix, receiving, by the first subscriber device from a gateway, a second subscriber device proxy address for the second subscriber device, and communicating, between the first subscriber device and the second subscriber device via the gateway, using the second subscriber device proxy address.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
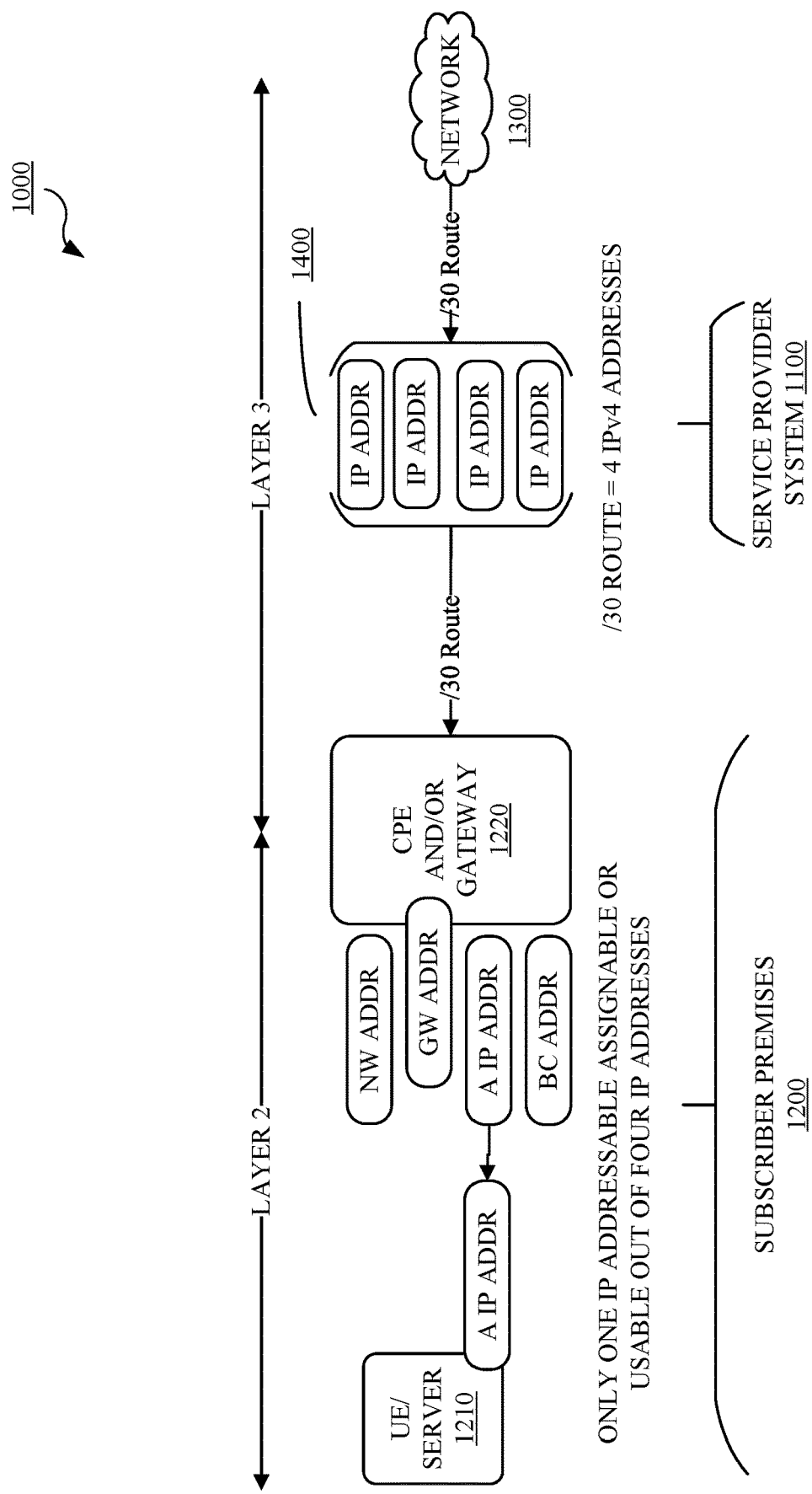
FIG. 1 is a diagram of an example of a IP service using a /30 prefix or small prefix.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, address resolution protocol processing, proxy address resolution protocol processing, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example of a static IP service using a /30 prefix or small prefix. Although the example is with respect to static IP service, examples are also applicable to dynamic IP service. A system 1000 can include a service provider system 1100 and a subscriber premises 1200. The subscriber premises 1200 can include user equipment, a server, and/or like devices (collectively "UE") 1210 and a customer premises equipment (CPE), a gateway, a router, and/or similar device (collectively a "gateway") 1220 which can provide the UE 1210 with access to the Internet via the service provider system 1100 and a network 1300. Communications between the gateway 1220, the service provider system 1100, and the network 1300 may be at least a layer 3 communications. Communications between the gateway 1220 and the UE 1210 may be at least a layer 2 communications. Communications between the described elements can include wired communications, wireless communications, or a combination thereof. The quantity of described devices or elements is illustrative. The system 1000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

Operationally, the service provider system 1100 can provide a static IP address or static IP service to the subscriber premises 1200 using a /30 routing prefix. In some implementations, the /30 routing prefix can be IPv4 addresses. The /30 routing prefix can provide 4 IP addresses 1400, where one IP address can be used as a network address (NW ADDR), a second IP address can be used as a gateway address (GW ADDR), and a third IP address can be used as a broadcast address (BC ADDR) per Internet networking rules. The fourth or remaining IP address can be assigned to the UE 1210 (A IP ADDR). That is, from the allocated four IP addresses, only one IP address is available for the subscriber's device.

Figure 2:
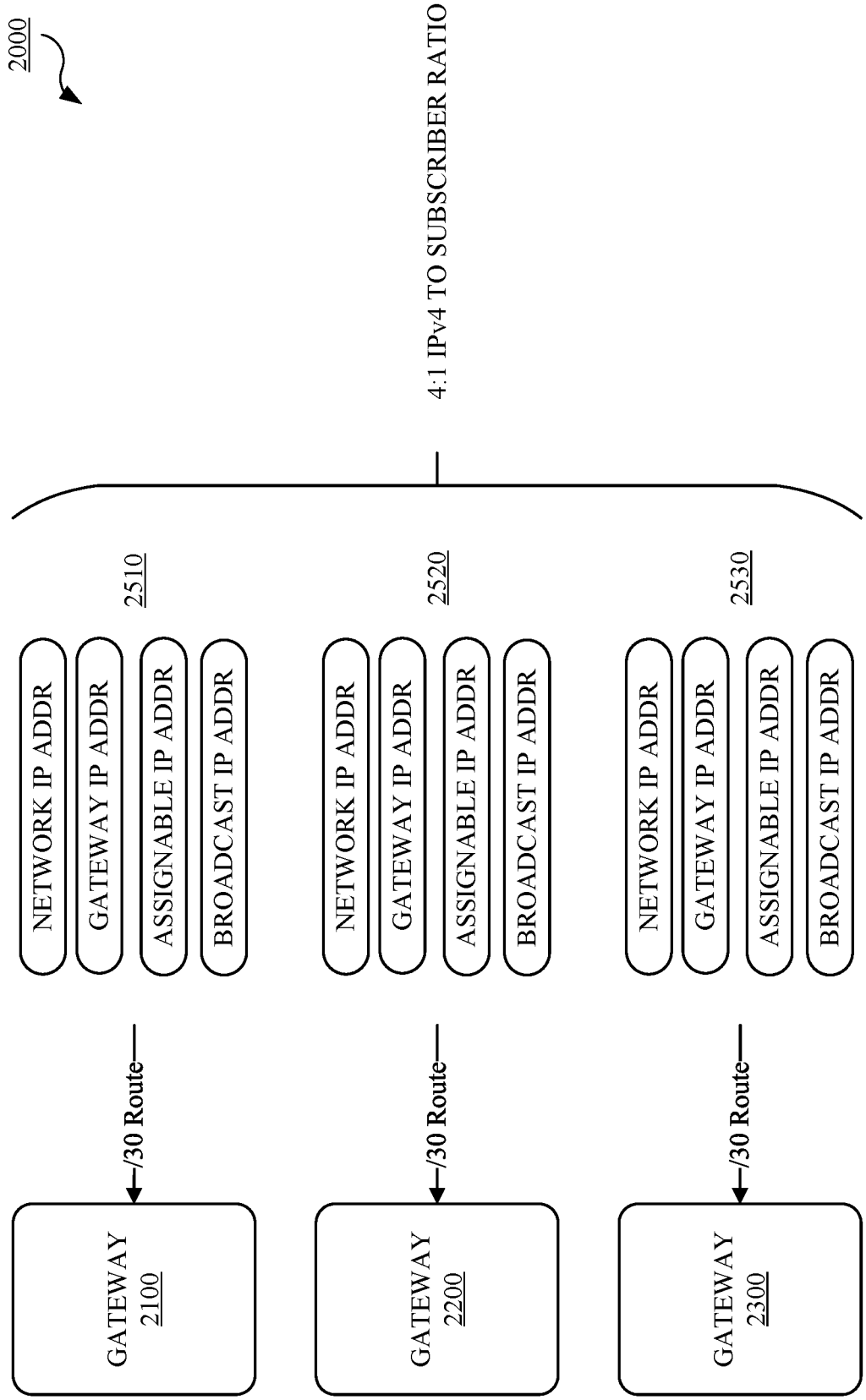
FIG. 2 is a diagram of another example of a IP service using a /30 routing prefix or small routing prefix.

FIG. 2 provides a further illustration of the inefficiencies associated with this static IP service delivery method. Although the example is with respect to static IP service, examples are also applicable to dynamic IP service. FIG. 2 is a diagram of multiple gateways each with a static IP service using a /30 routing prefix or small routing prefix. A system 2000 can include a gateway 2100, a gateway 2200, a gateway 2300, and a service provider system 2400. The system 2000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

As described for FIG. 1, the service provider system 2400 can provide a static IP address or static IP service to the gateway 2100, the gateway 2200, and the gateway 2300. The static IP service can be delivered to each of the gateway 2100, the gateway 2200, and the gateway 2300 using a /30 routing prefix 2510, 2520, and 2530, respectively. As before, each of the /30 routing prefix 2510, 2520, and 2530 can include 4 IP addresses where one IP address can be used as a network IP address (NETWORK IP ADDR), a second IP address can be used as a gateway IP address (GATEWAY IP ADDR), and a third IP address can be used as a broadcast IP address (BROADCAST IP ADDR) per Internet networking rules. That is, out of 12 allocated IP addresses only 3 IP addresses are available for use by respective subscribers associated with the gateway 2100, the gateway 2200, and the gateway 2300.

Figure 3:
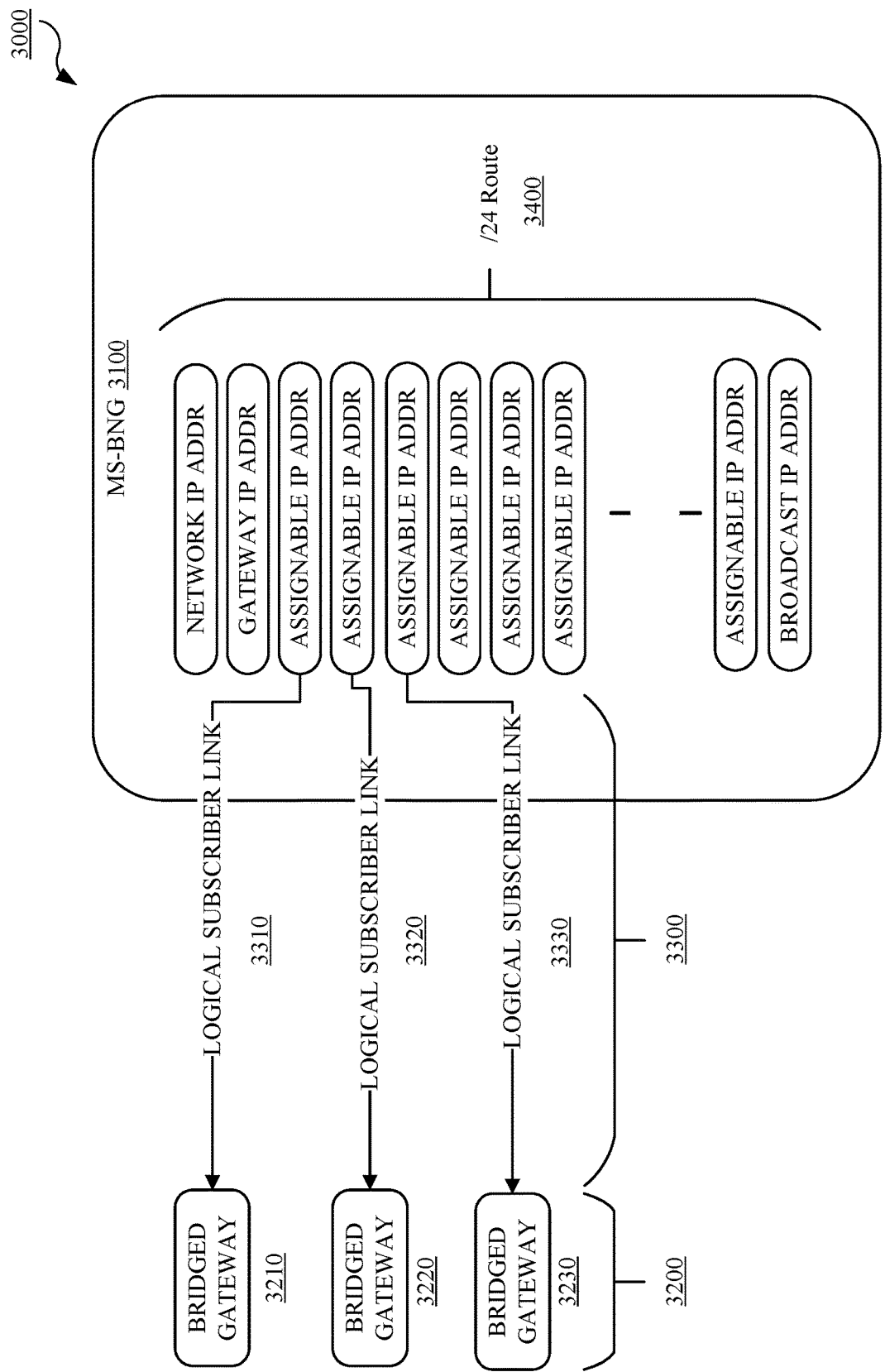
FIG. 3 is a diagram of an example of a virtual CPE architecture delivering a IP service using a /24 routing prefix or large routing prefix in accordance with embodiments of this disclosure.

FIG. 3 is a diagram of an example of a virtual CPE architecture 3000 for delivering a static and/or dynamic IP service using a /24 routing prefix or large routing prefix in accordance with embodiments of this disclosure. Although described with respect to static IP service, the methods and systems are equally applicable to dynamic IP service and/or dynamic IP address assignment. In implementations, a large routing prefix refers to a routing prefix of /24, /16, or larger. The virtual CPE (vCPE) architecture 3000 can simplify and more efficiently utilize current IPv4 assets to deliver the static and/or dynamic IP service by providing static and/or dynamic IPv4 based on vCPE service delivery overlay, decoupling host and topology address space to provide individualized IPv4 static and/or dynamic IP services, and facilitating communication between subscriber UEs seemingly on the same LAN (i.e., within the same routing prefix and/or mask range) (providing or enabling the distributed LAN environment). The virtual CPE (vCPE) architecture 3000 can include a Multi-Service Broadband Network Gateway (MS-BNG) 3100, and bridged gateways 3200 including bridged gateways 3210, 3220, and 3230, each of which are connected to the MS-BNG 3100 via logical subscriber links (LSLs) 3300 including LSLs 3310, 3320, and 3330, respectively. The virtual CPE architecture 3000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The MS-BNG 3100 can be located at the service provider system. In some implementations, the MS-BNG 3100 can maintain a large routing prefix 3400 (/24 or bigger) to service individual subscriber static and/or dynamic IPv4 addresses. The /24 routing prefix 3400 can provide 250 IP addresses that are assignable, a network IP address, a gateway IP address, and a broadcast IP address. As shown, the /24 routing prefix can provide a greater efficiency in contrast to the /30 routing prefix. In some implementations, the MS-BNG 3100 can offer Dynamic Host Configuration Protocol (DHCP) services with optional MAC address based reservations. In some implementations, the MS-BNG 3100 can support static configuration of IPv4 addresses by the subscriber. In some implementations, the MS-BNG 3100 can implement firewall rules and policies, security rules and policies, networking rules and policies, access rules and policies, privacy rules and policies, and other rules and policies as appropriate and applicable. In some implementations, the MS-BNG 3100 can provide proxy ARP function to facilitate communication between subscriber endpoints within the same MS-BNG-provided routing prefix as described herein.

The LSLs 3300 are subscriber specific logical point-to-point layer 2 connections between the bridged gateways 3200 and logical entities associated with respective assigned IP addresses at the MS-BNG 3100. The LSLs 3300 can be implemented using a variety of techniques. In some implementations, the LSLs 3300 can be a native Ethernet connection, statically or dynamically provisioned through a network. In some implementations, the LSLs 3300 can be an Ethernet connection dynamically established over an IP network using tunneling techniques. This can be referred to as an Overlay Ethernet LSL connectivity. In some implementations, Ethernet over Generic Routing Encapsulation (EoGRE) v6 can be used to establish a layer 2 adjacency between subscriber devices and/or bridged gateways 3200 and the logical entities associated with respective assigned IP addresses at the MS-BNG 3100.

The bridged gateways 3200 including the bridged gateways 3210, 3220, and 3230 are CPEs that are located at the subscriber premises. In implementations, the bridged gateways 3200 are layer 2 devices. Traffic between two subscriber devices located in the subscriber premises remains local as the bridged gateways 3200 act as an Ethernet switch capable of doing medium access control (MAC) learning. Only unicast traffic to be sent to the Internet, broadcast and multicast messages are forwarded to the MS-BNG 3100. Local unicast traffic is not sent to the MS-BNG 3100 or network. For example, this can include a file transfer between two computing devices, data, audio, and/or video streaming from a local storage device to an output device, a print job, and similar functions.

Figure 4:
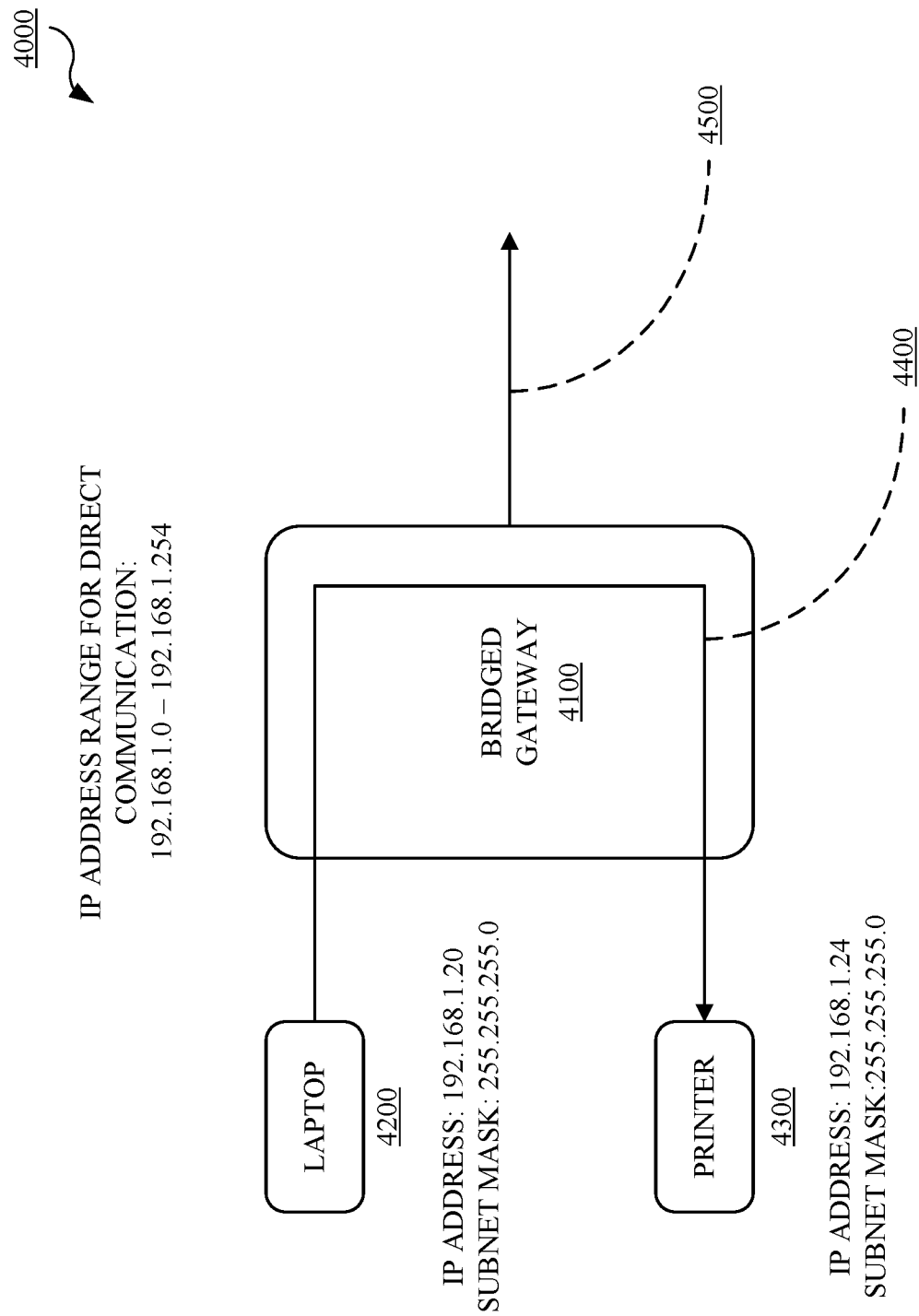
FIG. 4 is a diagram of an example of communications methods using the IP service with the /24 routing prefix or large routing prefix in accordance with embodiments of this disclosure.

An illustrative example is shown in FIG. 4, which is a diagram of an example of a virtual CPE architecture 4000 using a static and/or dynamic IP service with the /24 routing prefix or large routing prefix in accordance with embodiments of this disclosure. Although described with respect to static IP service, the methods and systems are equally applicable to dynamic IP service and/or dynamic IP address assignment. The virtual CPE architecture 4000 can include a bridged gateway 4100, which is connected to a MS-BNG such as the MS-BNG 3100 of FIG. 3. The virtual CPE architecture 4000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The bridged gateway 4100 can be connected to a laptop 4200 and a printer 4300. The laptop 4200 can be assigned a static IP address with a subnet mask: IP address 192.168.1.20 and subnet mask 255.255.255.0, and the printer 4300 can be assigned a static IP address with a subnet mask: IP address 192.168.1.24 and subnet mask 255.255.255.0. Given the networking rules and the subnet mask, each of the laptop 4200 and the printer 4300 knows that direct communication is available with any device that is within the IP address range of 192.168.1.0 to 192.168.1.254, i.e., within the LAN. For example, assume the user of the laptop 4200 needs to print a document on the printer 4300. The laptop 4200 can perform an ARP broadcast (using ARP functionality and/or protocol as between the bridged gateway 4100 and/or MS-BNG) to discover and obtain a MAC address for the printer 4300. The laptop 4200 can then directly communicate via the bridged gateway 4100 with the printer 4300, i.e., communication path 4400. For communications outside of the LAN, the laptop 4200 can interact or coordinate with the MS-BNG via the bridged gateway 4100, i.e., communication path 4500.

The MS-BNG 3100 can employ rules and policies to isolate a static IP address and associated connections from other static IP addresses address and associated connections that are based on, emanate from, or are delivered from the same routing prefix given a subscriber device's ability to discover what devices are in the same network and the ability to connect directly thereto. These isolation policies can lead to connectivity issues amongst subscriber devices that are in the distributed LAN environment. In particular, the subscriber devices the distributed LAN environment cannot communicate using a gateway in the vCPE platform (i.e., as in the case of an Internet destination) since the subscriber devices do not know that the other subscriber devices are not on the same LAN since they are in the distributed LAN environment. This problem and the solution of using a proxy ARP module in the MS-BNG 3100 is further described with respect to FIGS. 5-10.

Figure 5:
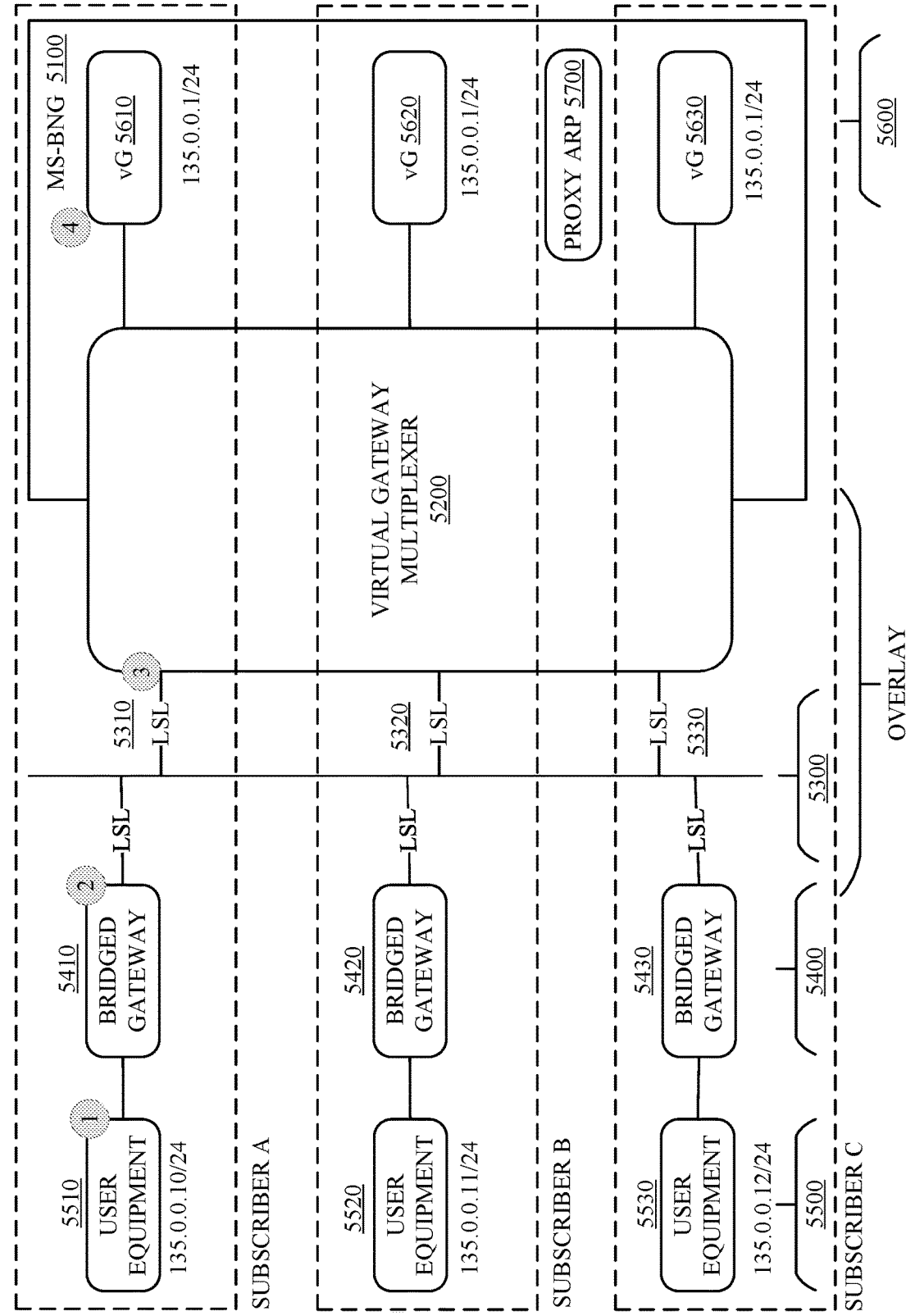
FIG. 5 is a diagram of an example of a virtual CPE architecture delivering a IP service using a /24 routing prefix or large routing prefix in accordance with embodiments of this disclosure.
Figure 6:
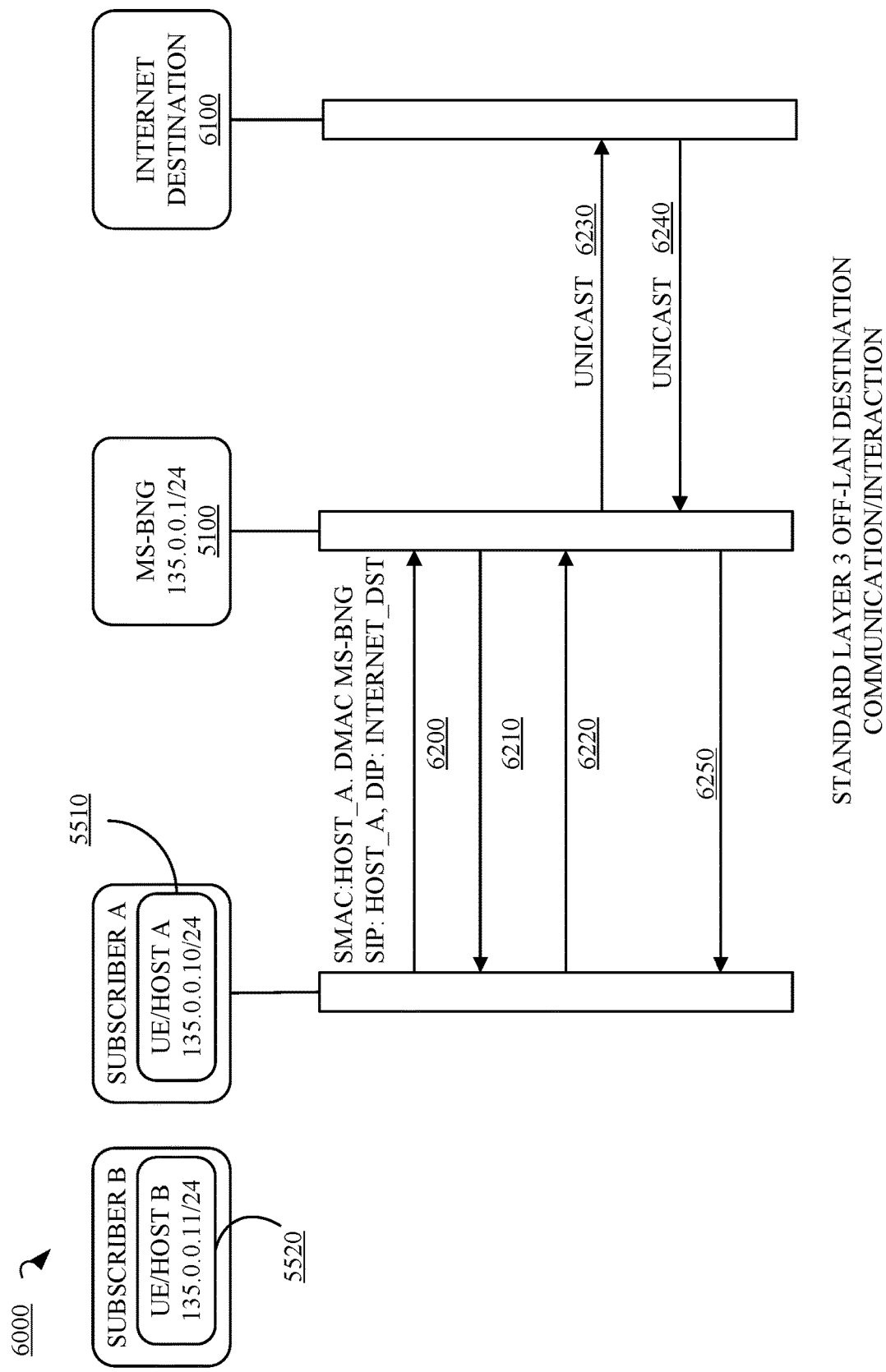
FIG. 6 is a diagram of an example of an Internet destination or off-LAN communications using the virtual CPE architecture of FIG. 5 in accordance with embodiments of this disclosure.
Figure 7:
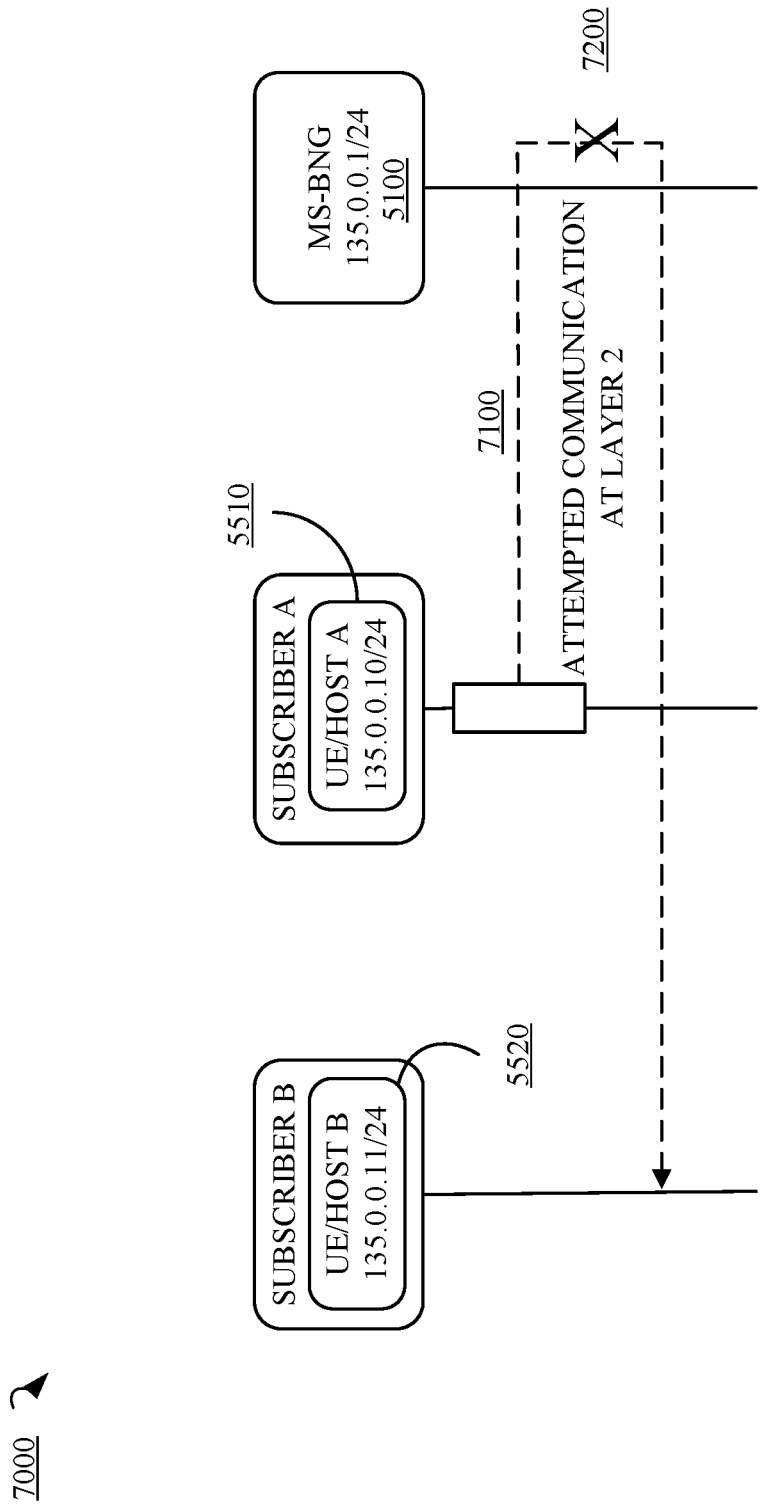
FIG. 7 is a diagram of an example of an attempt to do on-LAN communications (i.e., in a distributed LAN environment) using the virtual CPE architecture of FIG. 5 without a proxy ARP function in accordance with embodiments of this disclosure.

FIG. 5 is a diagram of an example of a virtual CPE architecture 5000 delivering a static and/or dynamic IP service using a /24 routing prefix or large routing prefix in accordance with embodiments of this disclosure. Although described with respect to static IP service, the methods and systems are equally applicable to dynamic IP service and/or dynamic IP address assignment. The vCPE architecture 5000 can include a MS-BNG 5100, a virtual gateway multiplexer 5200, LSLs 5300 including LSLs 5310, 5320, and 5330, bridged gateways 5400 including bridged gateways 5410, 5420, and 5430, and user equipment (UE) 5500 including user equipment 5510, 5520, and 5530. The MS-BNG 5100 can include virtual gateways (vGs) 5600 such as vG 5610, 5620, and 5630. The virtual CPE architecture 5000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The MS-BNG 5100 can be as described with respect to the MS-BNG 3100 and includes a proxy ARP module 5700 which enables communication between subscribers, such as subscriber A, subscriber B, and subscriber C, which are all within the MS-BNG 5100 provided routing prefix. In implementations, the proxy ARP module 5700 can be implemented with the vGs 5600. The functionality and/or operability of the proxy ARP module 5700 is further described with respect to FIGS. 5, 8, and 10. The LSLs 5300 can be as described with respect to the LSLs 3300. The bridged gateways 5400 can be as described with respect to the bridged gateways 3200.

The vGs 5600 can provide networking and service functions, including but not limited to, default IP gateway for the user equipment 5500 or LAN-side devices, termination of the LSLs 5400, IP address management, IP forwarding and IPv4 NAT capabilities, and termination of Internet-side interface. The vGs 5600 can be implemented on the MS-BNG 5100 and/or other service provider devices.

The virtual gateway multiplexer 5200 is a network function that maps layer 2 traffic between the bridged gateways 5400 and respective vGs 5600, and ensures traffic isolation between the subscriber domains.

In this implementation, the virtual CPE architecture 5000 can service multiple subscribers using the /24 routing prefix or large routing prefix. A single gateway address, for example, 135.0.0.0/24, can be used and/or re-used across all the vGs 5600 that are within the routing prefix or subnet mask range. Each subscriber, for example, subscriber A, subscriber B, and subscriber C can represent a subscriber domain which is isolated at a layer 2 by implementation and functionality of the LSLs 5300, the virtual gateway multiplexer 5200, and/or the MS-BNG 5100.

For each of subscriber A, subscriber B, and subscriber C, the user equipment 5510, 5520, and 5530 can be connected to the bridged gateways 5410, 5420, and 5430, respectively. The bridged gateways 5410, 5420, and 5430 are connected to the vGs 5610, 5620, and 5630, respectively, via the LSLs 5310, 5320, and 5330, respectively, and the virtual gateway multiplexer 5200. In this implementation, each user equipment 5510, 5520, and 5530 can be assigned a single IP (either statically configured by subscriber or assigned via DHCP from the respective vG 5610, 5620, and 5630) (1). For example, the user equipment 5510, 5520, and 5530 have IP addresses 135.0.0.10/24, 135.0.0.11/24, and 135.0.0.12/24, respectively. As described herein, the bridged gateways 5410, 5420, and 5430 can function as a learning bridge and participate in overlay encapsulation of user equipment Ethernet frames to the virtual gateway multiplexer 5200 via the LSLs 5310, 5320, and 5330, respectively (2). The virtual gateway multiplexer 5200 can select the appropriate vG based on criteria unique to the subscriber connection (3). For example, this can be the GREv6 source IPv6 address, the bridged gateway and/or CPE MAC address, and other like unique identifiers. Each of the vGs 5610, 5620, and 5630 is addressed with 135.0.0.1/24, performing as the gateway of the connected subscriber user equipment (4).

After configuration is completed with the static IP address, when a user equipment needs to communicate outside of the LAN and/or to the Internet, the user equipment can do so using the associated vG. This is illustrated with reference also to FIG. 6, which is a swim diagram 6000 of an example of an Internet destination or off-LAN communications using the virtual CPE architecture 5000. The swim diagram 6000 is operative between the subscriber A and the user equipment 5510, the subscriber B and the user equipment 5520, the MS-BNG 5100 (with the appropriate vGs), and an Internet destination 6100. The user equipment 5510 and the user equipment 5520 can each host or act as a host for a respective subscriber's activities, website, and the like. The communications between the described devices or elements can include wired communications, wireless communications, and/or a combination thereof. The swim diagram 6000 and elements therein are illustrative and may include additional, fewer, or different steps, flows, devices, entities, and the like which may be similarly or differently architected without departing from the scope of the specification and claims herein.

Operationally, after the configuration is completed with the static IP address, the user equipment 5510 can broadcast an ARP request for the MAC address of the assigned gateway IPv4 address (e.g., 135.0.0.1) to the MS-BNG 5100 (and the appropriate vG) (6200). The MS-BNG 5100 (and the appropriate vG) can return a ARP reply containing the vG's MAC address (6210). The user equipment 5510 can send or forward all traffic destined for the Internet destination 6100 to the vG MAC address (6220). The MS-BNG 5100 (and the appropriate vG) can then perform any layer 3 operations including, but not limited to, NAT processing, firewall functions, and the like, necessary to facilitate communication with the Internet destination 6100 (6230 and 6240). The MS-BNG 5100 (and the appropriate vG) can forward response traffic to the user equipment 5510 (6250). This then establishes the standard layer 3 off-LAN communications.

After configuration is completed with the static IP address, when a user equipment needs to communicate with other subscribers in the distributive LAN environment (without the proxy ARP functionality), the user equipment will attempt to do so at a layer 2 (utilizing the ARP broadcast to discover the other subscribers' user equipment MAC address) since the vCPE platform 5000 utilizes a single prefix across multiple subscribers. However, without the proxy ARP, this will fail due to layer 2 isolation between the subscriber domains. This is illustrated with reference also to FIG. 7, which is a swim diagram 7000 of an example of on-LAN communications using the virtual CPE architecture 5000. The swim diagram 7000 is operative between the subscriber A and the user equipment 5510, the subscriber B and the user equipment 5520, and the MS-BNG 5100 (with the appropriate vGs). The user equipment 5510 and the user equipment 5520 can each host or act as a host for a respective subscriber's activities, website, and the like. The communications between the described devices or elements can include wired communications, wireless communications, and/or a combination thereof. The swim diagram 7000 and elements therein are illustrative and may include additional, fewer, or different steps, flows, devices, entities, and the like which may be similarly or differently architected without departing from the scope of the specification and claims herein.

Operationally, after the configuration is completed with the static IP address, the user equipment 5510 and the user equipment 5520 will have static IP addresses within the same routing prefix and/or within the same subnet mask. There will be instances when the user equipment 5510, the user equipment 5520, and/or other user equipment in the distributive LAN environment will want to communicate with each other. In these instances, for example, the user equipment 5510 will broadcast an ARP request for the MAC address of the user equipment 5520 (7100) due to the user equipment 5520 being on the same routing prefix and/or same subnet mask. However, the MS-BNG 5100 (and/or the appropriate vG) will prevent ARP discovery interactions between subscribers/user equipment which are in the distributive LAN environment (7200). The MS-BNG 5100 (and/or the appropriate vG) will block broadcast and/or multicast traffic by application of security, isolation, firewall, and/or other rules and/or policies. These will be enforced to prevent snooping, interference, and other issues.

Moreover, since the user equipment 5510 believes it is on a LAN with the user equipment 5520, user equipment 5510 will not attempt to use off-LAN destined traffic techniques to communicate. That is, the user equipment 5510 will not attempt to contact the MS-BNG 5100 (and/or the appropriate vG) to send the traffic destined for the user equipment 5520 since the user equipment 5510 determined that the user equipment 5520 is on the same routing prefix and/or same subnet mask. However, as described above, the user equipment 5510 cannot directly communicate with the user equipment 5520 either. Therefore, there is no method for on-LAN traffic communications in the distributive LAN environment.

The MS-BNG 5100 includes the proxy ARP 5700 to enable on-LAN traffic communications in the distributive LAN environment. The proxy ARP 5700 can broadcast the ARP request on the adjacent LAN in the distributive LAN environment (i.e., the other subscriber domain) in response to a received ARP request. For example, when an ARP request is received by a vG from host A targeting host B, the vG may not need to forward the ARP request to host B's LAN as the MS-BNG 5100 can maintain an IP address to host/MAC address mapping (IA:HA list) of every LAN connected device. In implementations, standard ARP timeouts can be utilized by the proxy ARP function and ARP requests can be propagated as needed in the event of no mappings.

Figure 8:
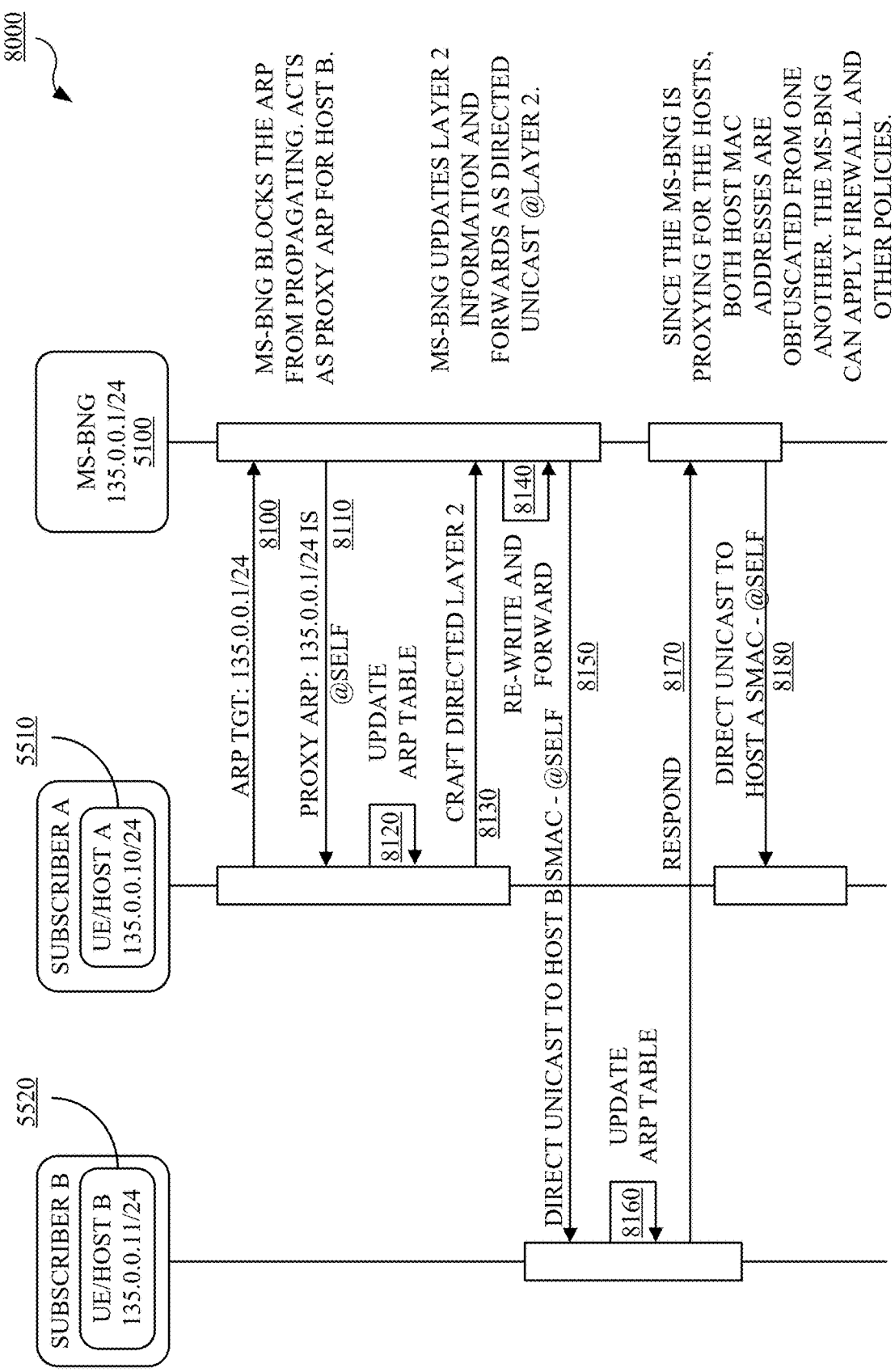
FIG. 8 is a diagram of an example of doing on-LAN communications with a proxy ARP module (i.e., in a distributed LAN environment) using the virtual CPE architecture of FIG. 5 in accordance with embodiments of this disclosure.

The on-LAN traffic communications in the distributive LAN environment using the proxy ARP is illustrated with reference also to FIG. 8, which is a swim diagram 8000 of an example of on-LAN communications using the virtual CPE architecture 5000. The swim diagram 8000 is operative between the subscriber A and the user equipment 5510, the subscriber B and the user equipment 5520, and the MS-BNG 5100 (with the appropriate vGs). The user equipment 5510 and the user equipment 5520 can each host or act as a host for a respective subscriber's activities, website, and the like. The communications between the described devices or elements can include wired communications, wireless communications, and/or a combination thereof. The swim diagram 8000 and elements therein are illustrative and may include additional, fewer, or different steps, flows, devices, entities, and the like which may be similarly or differently architected without departing from the scope of the specification and claims herein.

Operationally, when the user equipment 5510 wants to communicate with the user equipment 5520 or send a packet to the user equipment 5520, which is in the distributive LAN environment but is a separate subscriber domain or is one of multiple adjacent LANs in the distributive LAN environment, the user equipment 5510 can perform an ARP broadcast with the target domain, i.e., the user equipment 5520 (8100). The MS-BNG 5100 (and/or the appropriate vG) can block the ARP broadcast and the proxy ARP 5700 (in the MS-BNG 5100 or appropriate vG) can send an ARP response as a proxy for the user equipment 5510 (8110). The proxy ARP can send a system-generated MAC address that is per-prefix unique instead of using the real MAC address of the user equipment 5520 (proxy MAC address B). In implementations, the proxy MAC address B has to be unique within the subscriber domain. In implementations, the proxy MAC address can be routing prefix unique, subscriber domain unique, and/or combinations thereof. The user equipment 5510 can update its local ARP table with the received proxy MAC address B (8120) and can send layer 2 packets, traffic, message, or data (collectively "data") using the received proxy MAC address B (8130).

The MS-BNG 5100 (and/or the appropriate vG) can perform an update for the layer 2 data received with the received proxy MAC address B (8140). For example, the MS-BNG 5100 (and/or the appropriate vG) can insert a system-generated MAC address that is per-prefix unique as a proxy MAC address for the user equipment 5510 (proxy MAC address A) instead of using the real MAC address of the user equipment 5510. In implementations, the proxy MAC address can be routing prefix unique, subscriber domain unique, and/or combinations thereof. The MS-BNG 5100 (and/or the appropriate vG) can forward and direct the updated layer 2 data to the user equipment 5520 (8150) using the proxy MAC address A. The user equipment 5520 can update its local ARP table with the received proxy MAC address A (8160) and can send a layer 2 response (8170) using the received proxy MAC address A (8170). The MS-BNG 5100 (and/or the appropriate vG) can update the layer 2 response with the proxy MAC address A and forward/direct the updated layer 2 response to the user equipment 5510 (8180). This can be repeated until communications are terminated between the user equipment 5510 and the user equipment 5520.

In the above, the proxy ARP is proxying on behalf of both the user equipment 5510 and the user equipment 5520. Consequently, the user equipment 5510 and the user equipment 5520 are unaware of the real MAC addresses of the other. That is, the real MAC addresses are obfuscated from one another. The MS-BNG 5100 (and/or the appropriate vG) can apply rules and policies as necessary. The proxy ARP therefore enables on-LAN communications with the distributed LAN environment while maintaining subscriber domain isolation and other security and/or privacy concerns.

Figure 9:
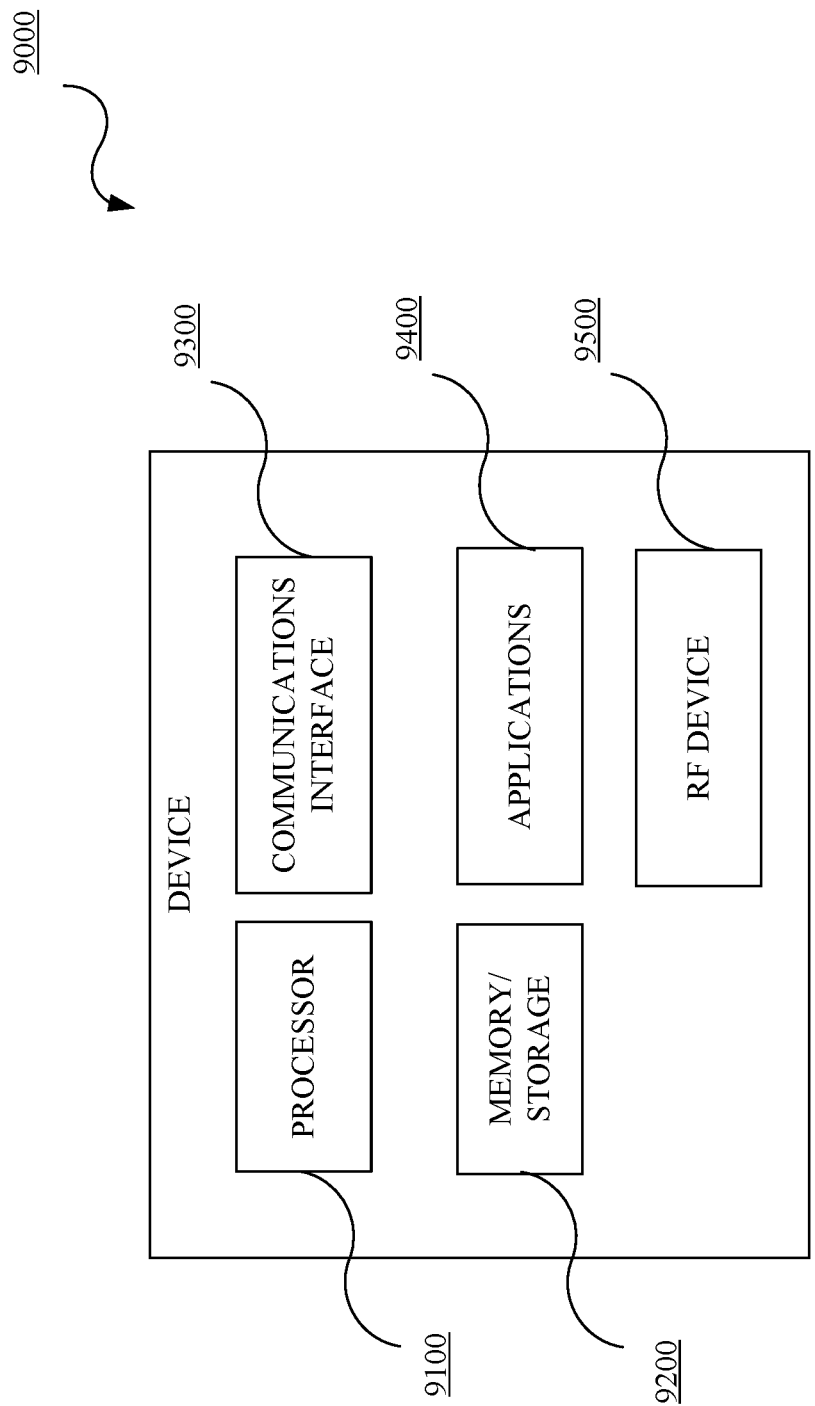
FIG. 9 is a block diagram of an example of a device in accordance with embodiments of this disclosure.

FIG. 9 is a block diagram of an example of a device 9000 in accordance with embodiments of this disclosure. The device 9000 may include, but is not limited to, a processor 9100, a memory/storage 9200, a communication interface 9300, and applications 9400. In an implementation, the device 9000 may include a radio frequency device 9500. The device 9000 may include or implement, for example, the MS-BNG 5100, the virtual gateway multiplexer 5200, the LSLs 5300 including the LSLs 5310, 5320, and 5330, the bridged gateways 5400 including the bridged gateways 5410, 5420, and 5430, and the user equipment 5500 including the user equipment 5510, 5520, and 5530, and the virtual gateways 5600 such as the vGs 5610, 5620, and 5630. The applications 9400 can include the proxy ARP. The applicable or appropriate techniques or methods described herein may be stored in the memory/storage 9200 and executed by the processor 9100 in cooperation with the memory/storage 9200, the communications interface 8300, the applications 9400, and the radio frequency device 9500 (when applicable), as appropriate. The device 9000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 10:
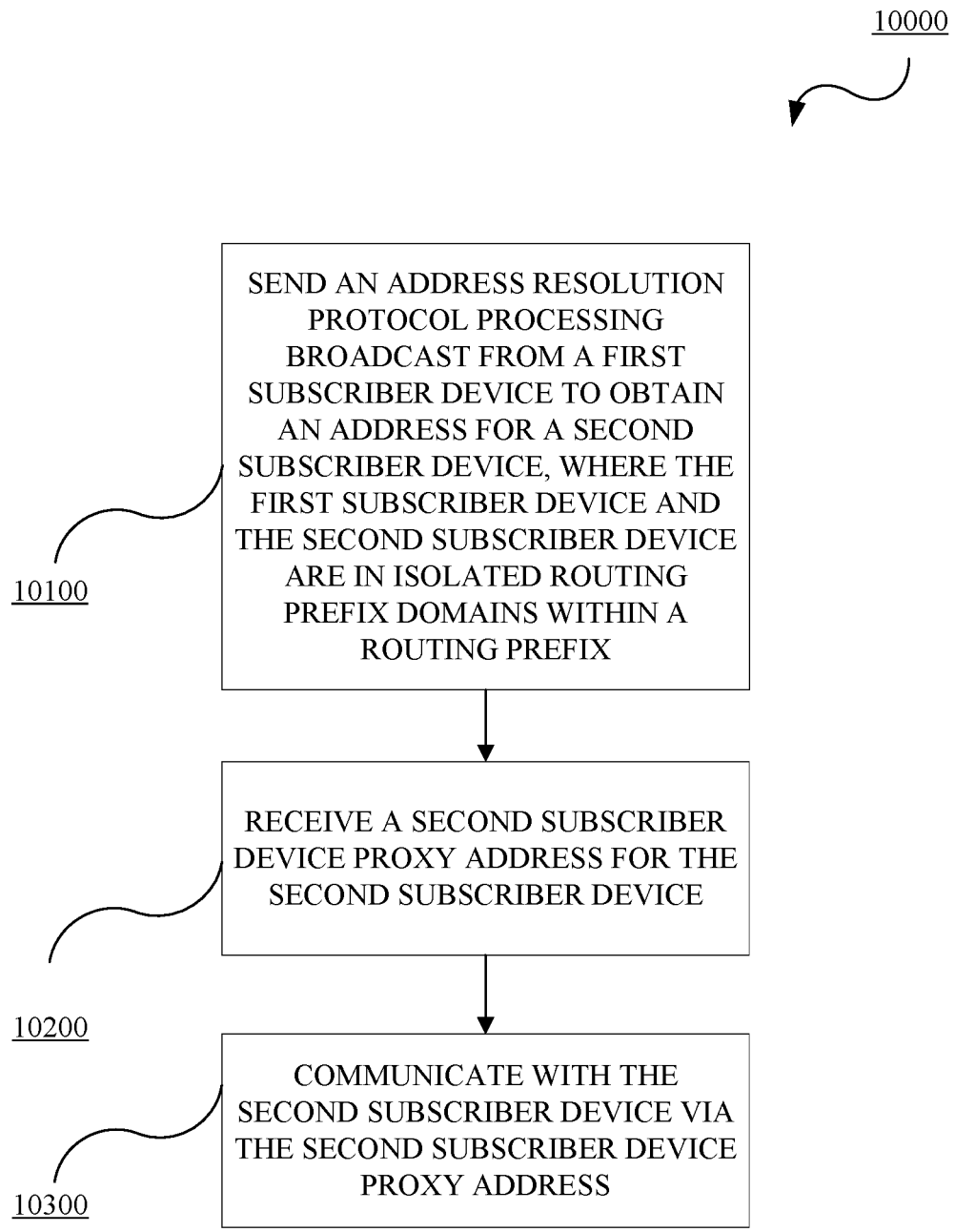
FIG. 10 is a flowchart of an example method for using a proxy ARP module with a IP service delivered with a /24 routing prefix or large routing prefix (i.e., in a distributed LAN environment) in accordance with embodiments of this disclosure.

FIG. 10 is a flowchart of an example method 10000 for proxy address resolution protocol processing in a distributive LAN environment in accordance with embodiments of this disclosure. The method 10000 includes: sending 10100 an address resolution protocol processing broadcast from a first subscriber device to obtain an address for a second subscriber device, where the first subscriber device and the second subscriber device are in isolated routing prefix domains within a routing prefix; receiving 10200 a second subscriber device proxy address for the second subscriber device; and communicating 10300 with the second subscriber device via the second subscriber device proxy address. For example, the technique 10000 may be implemented, as applicable and appropriate, by the MS-BNG 5100, the virtual gateway multiplexer 5200, the LSLs 5300 including the LSLs 5310, 5320, and 5330, the bridged gateways 5400 including the bridged gateways 5410, 5420, and 5430, and the user equipment 5500 including the user equipment 5510, 5520, and 5530, and the virtual gateways 5600 such as the vGs 5610, 5620, and 5630, and the device 9000.

The method 10000 includes sending 10100 an address resolution protocol processing broadcast from a first subscriber device to obtain an address for a second subscriber device, where the first subscriber device and the second subscriber device are in isolated routing prefix domains within a routing prefix. A routing prefix with a large number of useable IP addresses can be used for static and/or dynamic IP services. For example, a large routing prefix can include at least 250 useable IP addresses in addition to a broadcast IP address, a gateway IP address, and a network IP address. An assignment of a static/dynamic IP address to a subscriber from a routing prefix can establish a subscriber domain that is isolated from other subscriber domains using IP addresses from the same routing prefix. The subscriber domains are isolated to prevent direct communication with each other using, for example, an address resolution protocol processing broadcast. In the event of an address resolution protocol processing broadcast by a subscriber device to get a MAC address of a subscriber device in another subscriber domain, a gateway implementing network policies would prevent propagation of the address resolution protocol processing broadcast to obtain the MAC address of the subscriber device in the other subscriber domain.

The method 10000 includes receiving 10200 a second subscriber device proxy address for the second subscriber device. The gateway uses proxy address resolution protocol processing to generate a locally unique proxy MAC address that is sent to the first subscriber device in response to the address resolution protocol processing broadcast. In implementations, the proxy MAC address can be routing prefix unique, subscriber domain unique, and/or combinations thereof.

The method 10000 includes communicating 10300 with the second subscriber device via the second subscriber device proxy address. The first subscriber device can then communicate with the second subscriber device using the locally unique proxy MAC address via the proxy address resolution protocol processing at the gateway. The second subscriber device would also receive a locally unique proxy MAC address for the first subscriber device to be able to respond to the first subscriber device.

Figure 11:
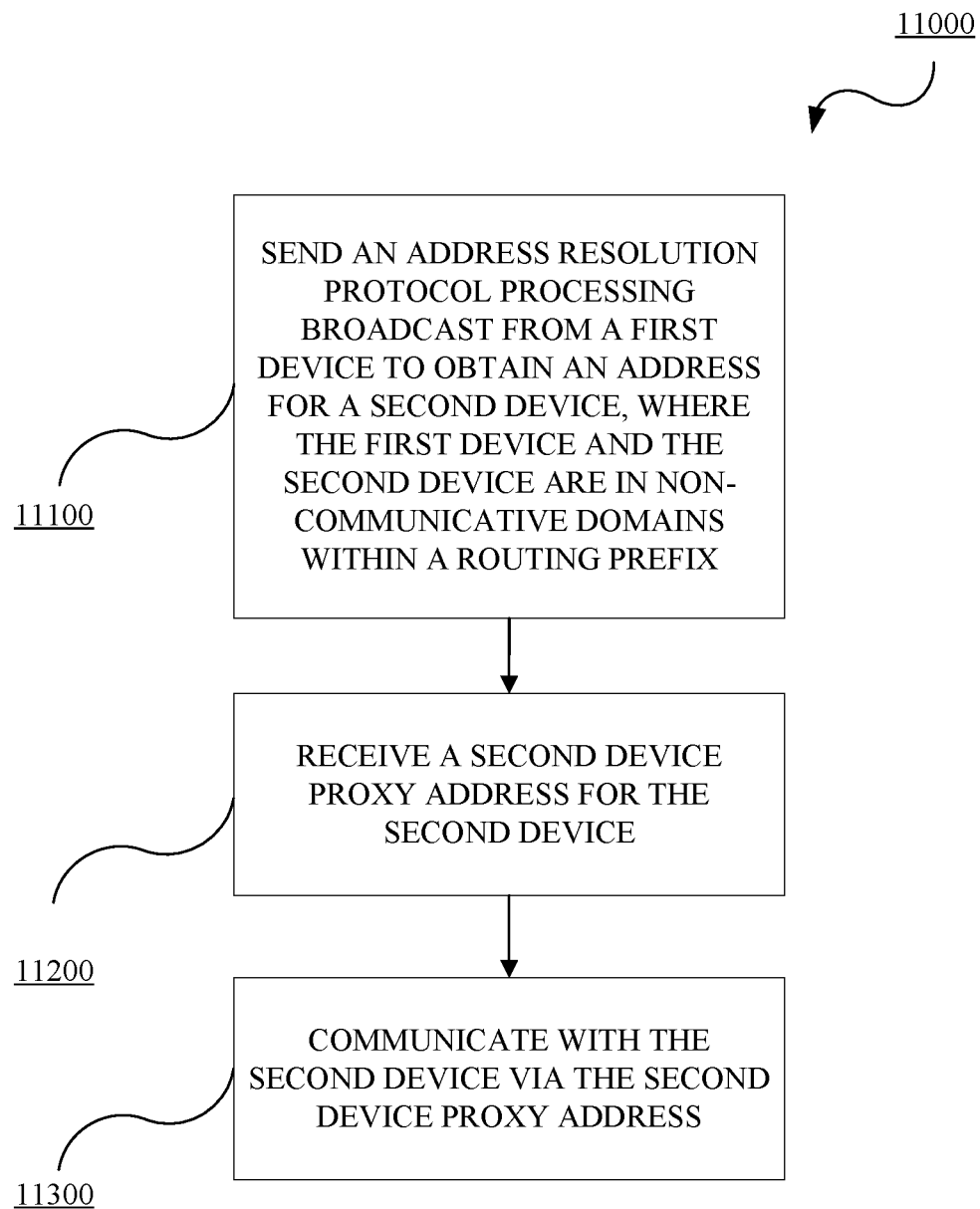
FIG. 11 is a flowchart of an example method for using proxy ARP with a IP service delivered with a /24 routing prefix or large routing prefix (i.e., in a distributed LAN environment) in accordance with embodiments of this disclosure.

FIG. 11 is a flowchart of an example method 11000 for proxy address resolution protocol processing in a distributive LAN environment in accordance with embodiments of this disclosure. The method 11000 includes: sending 11100 an address resolution protocol processing broadcast from a first device to obtain an address for a second device, where the first device and the second device are in non-communicative domains within a routing prefix; receiving 11200 a second device proxy address for the second device; and communicating 11300 with the second device via the second device proxy address. For example, the technique 10000 may be implemented, as applicable and appropriate, by the MS-BNG 5100, the virtual gateway multiplexer 5200, the LSLs 5300 including the LSLs 5310, 5320, and 5330, the bridged gateways 5400 including the bridged gateways 5410, 5420, and 5430, and the user equipment 5500 including the user equipment 5510, 5520, and 5530, and the virtual gateways 5600 such as the vGs 5610, 5620, and 5630, and the device 9000.

The method 11000 includes sending 11100 an address resolution protocol processing broadcast from a first device to obtain an address for a second device, where the first device and the second device are in non-communicative domains within a routing prefix. A routing prefix with a large number of useable IP addresses can be used for static/dynamic IP services. For example, a large routing prefix can include at least 250 useable IP addresses in addition to a broadcast IP address, a gateway IP address, and a network IP address. An assignment of a static/dynamic IP address to a subscriber from a routing prefix can establish an IP domain that is isolated from other IP domains using IP addresses from the same routing prefix. The IP domains are isolated to prevent direct communication with each other using, for example, an address resolution protocol processing broadcast. In the event of an address resolution protocol processing broadcast by a subscriber device to get a MAC address of a subscriber device in another IP domain, a gateway implementing network policies would prevent propagation of the address resolution protocol processing broadcast to obtain the MAC address of the subscriber device in the other IP domain.

The method 11000 includes receiving 11200 a second device proxy address for the second device. The gateway uses proxy address resolution protocol processing to generate a locally unique proxy MAC address that is sent to the first device in response to the address resolution protocol processing broadcast. In implementations, the proxy MAC address can be routing prefix unique, subscriber domain unique, and/or combinations thereof.

The method 11000 includes communicating 11300 with the second device via the second subscriber device proxy address. The first device can then communicate with the second device using the locally unique proxy MAC address via the proxy address resolution protocol processing at the gateway. The second device would also receive a locally unique proxy MAC address for the first device to be able to respond to the first device.

The described methods and systems for proxy address resolution protocol processing can include a method for proxy address resolution protocol processing. The method can include sending, by a first subscriber device, an address resolution protocol processing broadcast to obtain a second subscriber device address, wherein the first subscriber device and the second subscriber device are in isolated routing prefix domains within a routing prefix, receiving, by the first subscriber device from a gateway, a second subscriber device proxy address for the second subscriber device, and communicating, between the first subscriber device and the second subscriber device via the gateway, using the second subscriber device proxy address.

In some implementations, the second subscriber device address is a medium access control address and the second subscriber device proxy address is a proxy medium access control address. In some implementations, the second subscriber device proxy address is at least locally unique to a routing prefix domain associated with the first subscriber device. In some implementations, the second subscriber device uses a first subscriber device proxy address generated by the gateway. In some implementations, the first subscriber device proxy address is at least locally unique to a routing prefix domain associated with the second subscriber device. In some implementations, the first subscriber device proxy address is a proxy medium access control address. In some implementations, the gateway prevents propagation of the address resolution protocol processing broadcast in view of network isolation policies. In some implementations, the first subscriber device is prevented by network rules from sending an address resolution protocol processing broadcast to obtain an address of the gateway as the first subscriber device and the second subscriber device are within the same routing prefix.

The described methods and systems for proxy address resolution protocol processing can include a method for proxy address resolution protocol processing. The method can include receiving, by a gateway from a first user equipment, an address resolution protocol processing broadcast to obtain an address of a second user equipment, wherein the first user equipment and the second user equipment are in non-communicative domains within a routing prefix, sending, by the gateway to the first user equipment, a proxy address for the second user equipment; and facilitating, by the gateway, communications between the first user equipment and the second user equipment using the proxy address.

In some implementations, the address is a medium access control address and the proxy address is a proxy medium access control address. In some implementations, the proxy address is at least locally unique to a domain associated with the first user equipment. In some implementations, the method further includes sending, by the gateway to the second user equipment, a different proxy address for the first user equipment. In some implementations, the different proxy address is at least locally unique to a domain associated with the first user equipment. In some implementations, the different proxy address is a proxy medium access control address. In some implementations, the method further includes blocking, by the gateway, propagation of the address resolution protocol processing broadcast in view of network isolation policies. In some implementations, network rules prevent the first user equipment from sending an address resolution protocol processing broadcast to obtain an address of the gateway as the first user equipment and the second user equipment are within the same routing prefix.

The described methods and systems for proxy address resolution protocol processing can include a network. The network can include a gateway configured to provide static or dynamic Internet Protocol addresses from a routing prefix; and subscriber devices, each subscriber device associated with a static or dynamic Internet Protocol address from the routing prefix to establish a subscriber domain communicatively isolated from other subscriber domains established from the static or dynamic Internet Protocol addresses in the routing prefix. The gateway is further configured to receive, from one subscriber device of the subscriber devices, an address resolution protocol processing broadcast to obtain a medium access control address of another subscriber device of the subscriber devices, send, to the one subscriber device of the subscriber devices, a proxy medium access control address for the another subscriber device of the subscriber devices, and facilitate communications between the one subscriber device of the subscriber devices and the another subscriber device of the subscriber devices using the proxy medium access control address.

In some implementations, the gateway is further configured to send, to the another subscriber device of the subscriber devices, another proxy medium access control address for the one subscriber device of the subscriber devices. In some implementations, proxy medium access control address is at least locally unique to a subscriber domain associated with the one subscriber device of the subscriber devices and the another proxy medium access control address is at least locally unique to a subscriber domain associated with the another subscriber device of the subscriber devices. In some implementations, the gateway is further configured to prevent propagation of the address resolution protocol processing broadcast in view of network isolation rules for the subscriber domains where the routing prefix is same.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for proxy address resolution protocol processing, the method comprising:
    sending, by a first subscriber device, an address resolution protocol processing broadcast to obtain an address for a second subscriber device, wherein the first subscriber device and the second subscriber device are in isolated routing prefix domains within a routing prefix;
    receiving, by the first subscriber device from a gateway, a second subscriber device proxy address for the second subscriber device, wherein the second subscriber device proxy address is at least locally unique to a routing prefix domain associated with the first subscriber device; and
    communicating, between the first subscriber device and the second subscriber device via the gateway, wherein the first subscriber device sends data using the second subscriber device proxy address and the gateway updates the data with a first subscriber device proxy address for the first subscriber device, and wherein the first subscriber device proxy address is at least locally unique to a routing prefix domain associated with the second subscriber device.

2. The method of claim 1, wherein the second subscriber device address is a medium access control address and the second subscriber device proxy address is a proxy medium access control address.

3. The method of claim 1, wherein the second subscriber device proxy address is generated by the gateway.

4. The method of claim 1, wherein the a first subscriber device proxy address is generated by the gateway.

5. The method of claim 1, wherein receiving the second subscriber device proxy address comprises:
    updating, by the first subscriber device, an address resolution protocol table with the second subscriber device proxy address.

6. The method of claim 1, wherein the first subscriber device proxy address is a proxy medium access control address.

7. The method of claim 1, wherein the gateway prevents propagation of the address resolution protocol processing broadcast in view of network isolation policies.

8. The method of claim 1, wherein the first subscriber device is prevented by network rules from sending an address resolution protocol processing broadcast to obtain an address of the gateway as the first subscriber device and the second subscriber device are within a same routing prefix.

9. A method for proxy address resolution protocol processing, the method comprising:
    receiving, by a gateway from a first user equipment, an address resolution protocol processing broadcast to obtain an address of a second user equipment, wherein the first user equipment and the second user equipment are in non-communicative domains within a routing prefix;
    sending, by the gateway to the first user equipment, a proxy address for the second user equipment, wherein the proxy address is at least locally unique to a domain associated with the first user equipment; and
    facilitating, by the gateway, communications between the first user equipment and the second user equipment, wherein the first user equipment sends data using the proxy address and the gateway updates the data with a different proxy address for the first user equipment, and wherein the different proxy address is at least locally unique to a domain associated with the second user equipment.

10. The method of claim 9, wherein the address is a medium access control address and the proxy address is a proxy medium access control address.

11. The method of claim 9, wherein the proxy address is generated by the gateway.

12. The method of claim 9, further comprising:
    receiving, by the gateway from the second user equipment, return data using the different proxy address.

13. The method of claim 12, wherein the different proxy address is generated by the gateway.

14. The method of claim 9, wherein the different proxy address is a proxy medium access control address.

15. The method of claim 9, further comprising:
    blocking, by the gateway, propagation of the address resolution protocol processing broadcast in view of network isolation policies.

16. The method of claim 15, wherein network rules prevent the first user equipment from sending an address resolution protocol processing broadcast to obtain an address of the gateway as the first user equipment and the second user equipment are within a same routing prefix.

17. A network, comprising:
    a gateway comprising a processor configured to provide static Internet Protocol addresses from a routing prefix; and
    subscriber devices, each subscriber device associated with a static or dynamic Internet Protocol address from the routing prefix to establish a subscriber domain communicatively isolated from other subscriber domains established from the static or dynamic Internet Protocol addresses in the routing prefix,
    wherein the processor is further configured to:
        receive, from one subscriber device of the subscriber devices, an address resolution protocol processing broadcast to obtain a medium access control address of another subscriber device of the subscriber devices;
        send, to the one subscriber device of the subscriber devices, a proxy medium access control address for the another subscriber device of the subscriber devices, wherein the proxy medium access control address is at least locally unique to a subscriber domain associated with the one subscriber device of the subscriber devices;

receive, from the one subscriber device of the subscriber devices, data sent using the proxy medium access control address;

update the data with another proxy medium access control address for the one subscriber device of the subscriber devices, wherein the another proxy medium access control address is at least locally unique to a subscriber domain associated with the another subscriber device of the subscriber devices; and forward the data to the another subscriber device of the subscriber devices.

18. The network of claim 17, wherein the processor is further configured to:

generate the proxy medium access control address for the another subscriber device of the subscriber devices and the another proxy medium access control address for the one subscriber device of the subscriber devices.

19. The network of claim 17, wherein the processor is further configured to: receive, from the another subscriber device of the subscriber devices, return data sent using the another proxy medium access control address.

20. The network of claim 17, wherein the processor is further configured to:

prevent propagation of the address resolution protocol processing broadcast in view of network isolation rules for the subscriber domains where the routing prefix is same.

* * * * *